May 2, 1933.   J. D. MOFFET   1,907,211
STEERING CONTROL APPARATUS
Filed Aug. 22, 1928   2 Sheets-Sheet 1
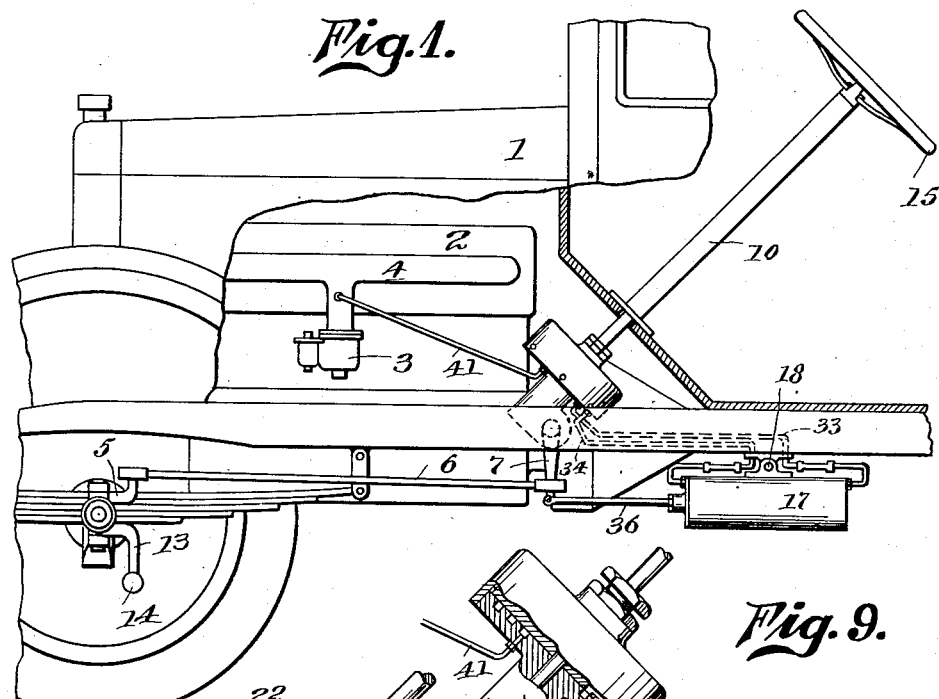
Fig.1.
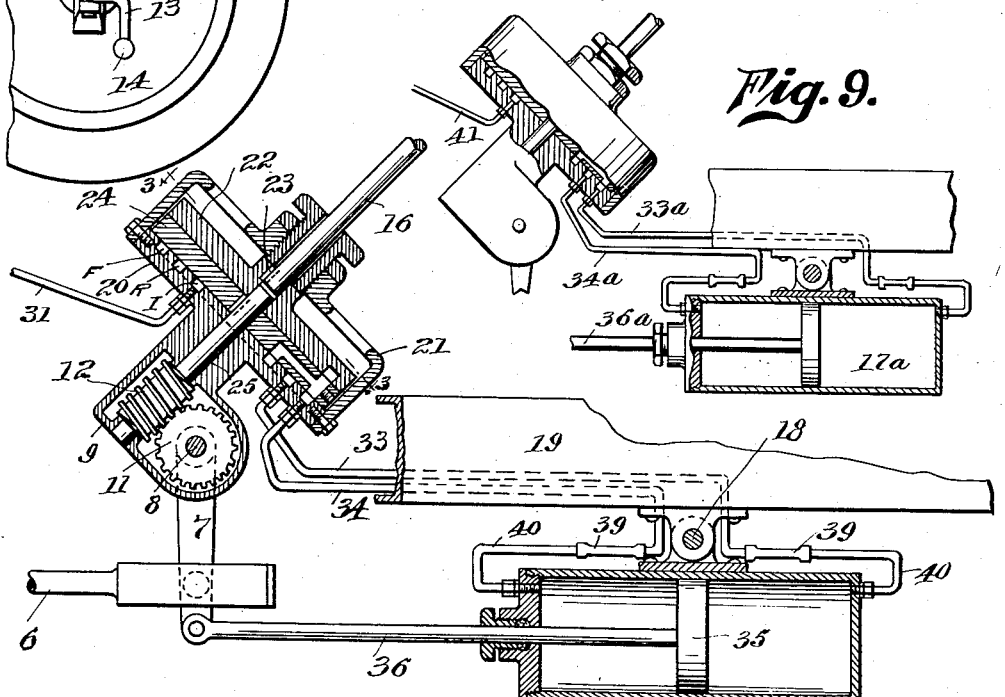
Fig.9.
Fig.2.
Inventor
John D. Moffet
By Lyon & Lyon
Attorneys May 2, 1933.  J. D. MOFFET  1,907,211
STEERING CONTROL APPARATUS
Filed Aug. 22, 1928   2 Sheets-Sheet 2
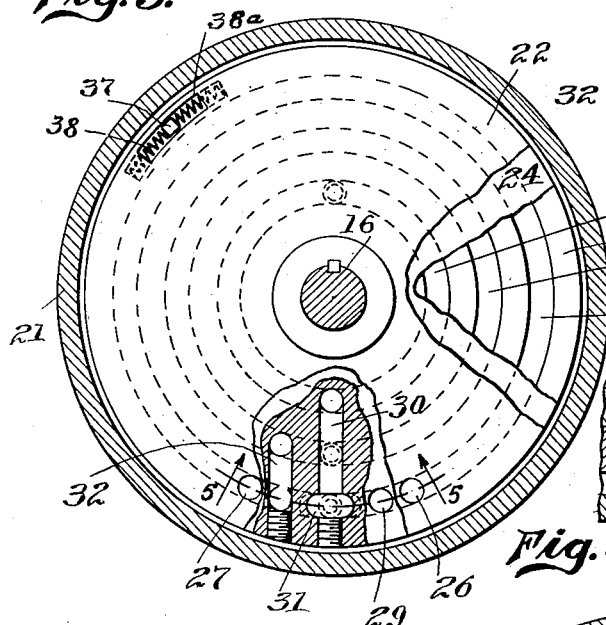
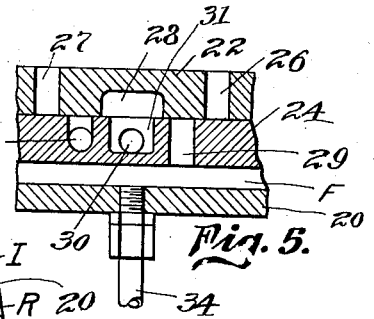
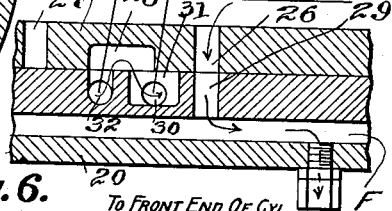
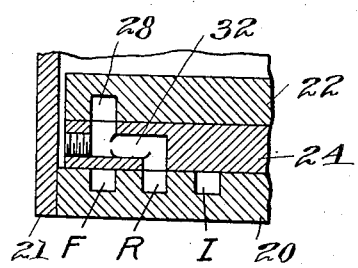
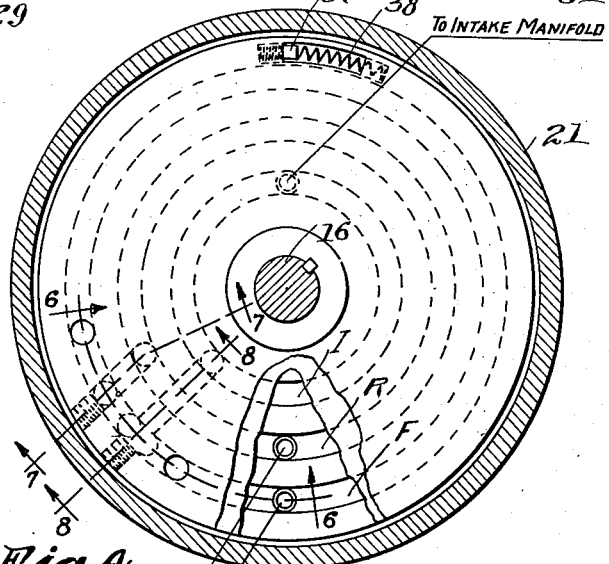
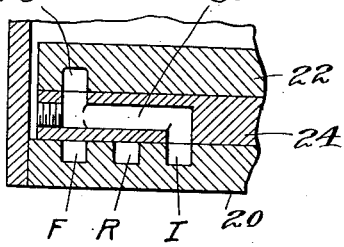

Patented May 2, 1933

1,907,211

UNITED STATES PATENT OFFICE

JOHN D. MOFFET, OF INGLEWOOD, CALIFORNIA

STEERING CONTROL APPARATUS

Application filed August 22, 1928. Serial No. 301,244.

This invention relates to steering control apparatus for automobiles. In parking automobiles, particularly large cars having balloon tires, it requires considerable force to turn the wheels; in fact so much force is required at the steering wheel that it is difficult for a delicate person, or a woman, to park a large car.

Power steering gears have been heretofore employed, operating automatically by the rotation of the regular steering wheel of the car, but they have usually been complicated and usually involved the use of a liquid under pressure. It has also been attempted to provide such an apparatus utilizing a connection with the intake of the gas engine cooperating with atmospheric pressure, to develop power to assist in steering, but this apparatus last referred to utilizes a steering cylinder, both ends of which are connected with the intake of the engine, and the only assisting power developed by the steering cylinder is due to the difference in the partial vacuum developed in the ends of the steering cylinder and controlled by the driver of the car.

The general object of this invention is to produce a simple and compact steering apparatus which will employ a source of pressure different from atmospheric, for example greater, or less, than atmospheric pressure to cooperate with the atmospheric pressure to exert force upon the steering gear of the automobile.

A further object of the invention is to provide apparatus for this purpose which, in addition to performing the function of providing power for steering, will also perform the function of a dashpot to assist in holding the steered wheels in their steering position, whether this position be a straight position or an inclined steering position which would carry the car toward the right or left.

A further object of the invention is to provide apparatus of this kind which can be readily installed on cars that are already in use, by making simple alterations on the steering column and by the addition of a steering cylinder attached to the frame of the car.

Further objects of the invention will appear hereinafter.

The inventon consists in the novel parts and combination of parts to be described hereinafter, all of which contribute to produce an efficient steering control apparatus.

A preferred embodiment of the invention is described in the following specification, while the broad scope of the invention is pointed out in the appended claims.

In the drawings:

Figure 1 is a side elevation of an automobile, certain parts being broken away and shown in cross-section.

Figure 2 is a section in a vertical plane taken substantially at the axis of the steering shaft and showing the steering cylinder in longitudinal section. This view shows a short portion of the frame of the automobile and other parts broken away.

Figure 3 is a section taken about on the line 3—3 of Figure 2, upon an enlarged scale, certain parts being broken away. This view particularly illustrates the preferred construction for the control valve that controls the development of a partial vacuum and the control of atmospheric pressure in the steering cylinder, and shows parts of the valve in neutral position.

Figure 4 is a view similar to Figure 3, but showing the parts in the relation which they would have in steering to the right.

Figure 5 is a vertical section taken about on the line 5—5 of Figure 3 and illustrating the relation of the valve parts when in neutral position.

Figure 6 is a view similar to Figure 5, but taken on the line 6—6 of Figure 4, and illustrating the initial relation of the valve parts when the car is being steered to the right.

Figure 7 is a section taken on the line 7—7 of Figure 4, and further illustrating the cooperation of the valve ports in steering to the right.

Figure 8 is a view similar to Figure 7, but taken on the line 8—8 of Figure 4, and further illustrating the relation of the valve ports in steering to the right.

Figure 9 is a side elevation and partial section of the apparatus with certain parts broken away and illustrating the pipe arrangement employed for adapting the apparatus for use with compressed air instead of the partial vacuum developed in the intake manifold of the engine.

Before proceeding to a detailed description of the invention, it should be stated that my apparatus is capable of being used with a source of pressure greater or less than atmospheric pressure. This enables the apparatus to be used on heavy trucks, using compressed air brakes and also on light automobiles where a connection to the intake of the engine can be made and which will enable the apparatus to operate as a vacuum apparatus utilizing the atmospheric pressure to operate the steering gear.

In Figures 1 to 8 I illustrate the apparatus connected to the intake of the engine and in Figure 9 I illustrate the slight change in the pipe connections which is necessary to adapt the same apparatus for use with compressed air instead of with the intake connections.

Referring to Figures 1 to 8, and particularly to Figure 1, 1 indicates an automobile provided with an ordinary gas engine 2 having a carburetor 3 and intake manifold 4. The steering gear of the automobile, except for its controlling means, is the same as usually employed, involving the use of the usual steering knuckle 5 to which a steering link 6 is connected, the rear end of the link being attached by flexible joint to a steering arm 7. This steering arm is rigid with rock shaft 8 mounted in the worm housing 9 which is set in alignment with the steering post 10 of the automobile. The rock shaft 8 is the same as the shaft usually employed at this point and carries a regular worm wheel 11 meshing with the usual worm 12.

A worm such as the worm 12 is usually attached to the lower end of the steering shaft mounted in the steering post 10. The thread on the worm is of such a character that in steering to the right the steering arm 7 will be moved toward the rear of the car, thereby exerting tension in the link 6. This will steer the left hand front wheel toward the right and by reason of the knuckle arm 13 and the drag link 14 the movement of the left wheel will be imparted to the front wheel at the right hand side of the car.

In applying my invention to such a steering apparatus I interpose between the hand wheel 15 and the worm 12 a hand controlled valve. This valve is preferably in the form of a rotary valve coaxial with the regular steering shaft that is carried in the steering post 10. The operation of this valve controls connections from a source of pneumatic pressure to a steering cylinder so that a force will be exerted upon the lever 7 to effect steering by power. In order to accomplish this I provide a steering shaft 16 to take the place of the regular steering shaft in the steering post 10, the upper end of this shaft or spindle being rigidly attached to the steering wheel 15. To the lower end of this shaft, or spindle, 16 my pneumatic valve is attached. This valve includes in its construction means for connecting either end of the power means to the compressed air or to the intake of the engine, in which a partial vacuum is developed, and at the same time connecting the opposite end of the power means to the atmosphere. In this way I develop a difference of pressure in the power means that operates to steer the car.

One of the advantages of my apparatus is that the worm 12 always operates as a check on the power means so that the power means cannot move the steering gear any further than the steering rotation of the steering wheel 15 will permit. In the operation of the apparatus the power merely backs up the movement of the steering wheel 15, in other words the steering rotation of the steering wheel simply releases the power as desired, developing force to steer the car but always holding the power in check, due to the presence of the worm 12.

The valve mechanism includes a valve member which is rigid with the steering shaft that carries the hand wheel 15, and it also includes a coaxial valve member connected with the wheels for steering the same. These valve members are so connected as to permit a limited rotary movement of the valve member that is moved by the steering wheel, with respect to the coaxial valve member. This relative movement controls ports in the two valve members referred to and in a portion of the casing that constitutes a fixed valve member. In other words, there is a certain amount of lost movement between the valve member that is carried by the shaft 16 and the coaxial valve member that is carried by the shaft of the worm 12. This possible relative movement gives complete valve control and, furthermore, in case the power means fails to operate, after the lost motion is taken up, the steering wheel can steer the car in the regular way. This renders my steering control apparatus independent of failure of the power means to operate. That is to say, if the power means fails to operate the car can be steered in the regular way with a little more lost motion in the steering apparatus than is usual.

In order to exert force on the steering apparatus I provide a steering cylinder 17 (see Figure 2) which, in the present embodiment of the invention, is an ordinary cylinder attached near its middle point and on its upper side by a pivot pin 18 on the under side of the frame 19 of the automobile. The ends of this cylinder are respectively connected with two passages in a fixed valve member 20 which constitutes the bottom of a casing 21 in which the other two valve members operate. In the present instance, I provide a movable valve member 22, in the form of a disc, which is connected by key 23 to the steering shaft 16 so that it can be rotated by the shaft. This disc 22 seats on a coaxial valve member 24 in the form of a disc keyed to the shaft 25 of the worm 12. The upper valve member 22 (see Figure 5) is provided with two atmospheric ports 26 and 27, which extend through it and between these ports the under side of this valve member is provided with a port 28. Near the port 26 the coaxial valve member 24 is provided with a through port 29 and to the left of this through port 29 the valve member 24 is provided with a radial port 30 with an enlarged chamber 31 near its outer end and opening onto the upper face of the valve member 24, so that it can communicate with the port 28. The radial port 30 extends across to a point near the shaft 25 at which point it opens onto the lower face of the valve member 24 so as to maintain communication with a circular port I formed in the upper face of the fixed valve member 20. This port I is connected by a pipe connection 41 with the intake 4 of the engine.

In addition to the radial port 30, I provide another radial port 32 (see Figure 3) which, at its outer end, opens onto the upper face of the valve member 24 and at its inner end opens onto the under face of the valve member 24 so as to communicate with a circular port R which is connected by a pipe connection 33 with the rear end of the cylinder 17. The upper face of the fixed valve member 20 is provided with another annular or circular port F which is connected by pipe connection 34 with the forward end of the cylinder 17.

Figure 5 shows these valve members in their neutral position, at which time neither end of the cylinder 17 is in communication with the atmosphere.

Figure 6 shows the valve members in their relative position in steering to the right. In this position of the valve members the valve member 22, at its lower edge (where the sections 5—5 and 6—6 are taken) will be displaced toward the left, thereby bringing the port 26 in line with the port 29 and opening communication through the pipe connection 34 to the forward end of the steering cylinder. In this position of the valve members the port 28 will open communication between the ports 32 and 30 thereby connecting the circular port I with the circular port R and this will bring the rear end of the cylinder 17 into communication with the intake manifold 4 of the engine. When this occurs the atmospheric pressure admitted to the left end of the cylinder 17 will exert its force against the piston 35 (normally in mid-position) in the cylinder and through its piston rod 36 attached to lever 7, will pull the link 6 toward the rear of the car. This will have the effect of steering the wheels of the car toward the right.

In steering toward the left the port 28 will connect up the ports 30 and 29, producing an opposite effect in the steering cylinder. That is to say, the intake manifold will be connected to the forward end of the cylinder and at the same time the port 27 will align with the port 32 so as to admit atmospheric pressure to the rear end of the cylinder. This will produce a forward movement in the piston 36 and steer the wheels of the automobile to the left.

I provide means for permitting a limited rotary movement of the movable valve member 22 with relation to the coaxial valve member 24. This means is preferably constructed so that after the steering movement has occurred in the valve member 22, the valve member 24 will follow up and come into neutral position. In order to accomplish this, I provide a slot 38ª in the valve member 22 (see Figure 3) and I provide a stop pin 37 on the valve member 24 that projects up into this slot. A coil spring 38 is placed in this slot on one side of the pin 37 and a similar spring 38 on the other side. These springs are of equal force and will operate to neutralize the valve member 24 after a steering movement. Figure 4 indicates the relation of the upper valve member 22 to the lower valve member 24 when the steering movement to the right has taken place and represents the parts before the springs have neutralized the coaxial valve member 24.

The connections 33 and 34 preferably include fixed pipes the bodies of which are run toward the rear to a point near the rocking pin 18, at which point flexible connections 39 are used to connect up with short pipes 40 leading into the opposite ends of the cylinder.

These flexible connections 39 are necessary in order to permit the rocking movement that must occur on the axis of the pin 18 when the piston rod 36 shoves the arm 7 forwardly or pulls it toward the rear.

My invention can be readily adapted for use with compressed air simply by reversing the connections of the pipes 33 and 34. This is illustrated in Figure 9 where the pipe 33a, corresponding to the pipe 33, is attached to the outer annular port F while the other pipe 34a, corresponding to the pipe 34, is attached to the similar circular port R. With this piping arrangement, it will be evident that in steering to the right the compressed air admitted to the inner ring port I through a pipe 41, will be admitted to the forward end of the cylinder 17a and thereby exert a pull in the piston rod 36a that would steer the wheels of the automobile to the right.

In the operation of the steering apparatus, it will be evident that after a steering movement to the right or to the left has occurred, if the steering wheel 15 is held in the new steering position for it, the springs 38 will eventually neutralize the valve member 24. When this neutralization has taken place the ports 26 and 27 of the upper valve member will be in the relative position shown in Figure 5. This will close off both ends of the steering cylinder 17 or 17a from the atmosphere. The effect of this is that the steering cylinder will then act as a dashpot tending to hold the steered wheels in the new steering position. This dashpot effect is desirable because it absorbs road shocks and makes the automobile steer with great ease.

On account of the use of the worm 12 and the worm wheel 11, the power of the power cylinder 17 can only swing the steering mechanism as far as the rotation of the worm by the hand-wheel 15 will permit. In other words, the power cylinder backs up the hand-wheel and steers the wheels to the greatest angle permitted by the steering wheel.

In practice, of course, the piston 35 will be substantially air tight in its cylinder. In the present drawings I have not illustrated any packing rings for this purpose, but a suitable piston packing would be employed.

It is understood that the embodiment of the invention described herein is only one of the many embodiments this invention may take, and I do not wish to be limited in the practice of the invention, nor in the claims, to the particular embodiment set forth.

What I claim is:

1. In a steering gear for an automobile having a steering shaft and handwheel for rotating the same, the combination of a steering cylinder, a piston movable therein, means connecting the piston with the wheels to be steered, a rotary valve actuated by the steering shaft, a source of pneumatic pressure different from atmospheric pressure, a pipe connection from the said valve to one end of said steering cylinder, a pipe connection from the said valve to the other end of the said steering cylinder, said valve having a rotary valve member rotating with said hand-wheel and having a coaxial valve member connected with the steering knuckles so as to rotate when the knuckles are swung in steering the automobile, the said valve including a fixed valve member, means for yieldingly holding the coaxial valve member in a neutral position with respect to the first-named valve member, said valve members having ports therein operating when the steering wheel is turned in one direction relatively to the said coaxial valve member, to admit atmospheric pressure to one end of said cylinder and to connect the other end of said cylinder with said source of pneumatic pressure.

2. In a steering gear for an automobile driven by a gas-engine having an intake manifold in which a partial vacuum is developed by the engine, the combination of a steering cylinder, a piston movable therein, means connecting the piston with the wheels to be steered, a steering shaft with a hand-wheel for rotating the same, a valve mounted on the axis of the steering shaft, including a valve member rigid with the steering shaft, and a coaxial valve member connected with the wheels for steering the same, said valve members having means for permitting a limited rotary movement of the first-named valve member with respect to the second-named valve member, a pipe connection corresponding to each end of the cylinder and connecting the same with the valve, a pipe connection connecting the intake manifold with the valve, said valve having ports operating when the hand-wheel is rotated to produce a relative movement between said two valve members, to connect either end of the cylinder to the intake and the other end of the cylinder to the atmosphere, and resilient means operating to bring the second-named valve member into a neutral position with respect to the first-named valve member after the turning movement of the hand-wheel in steering ceases.

3. In a steering gear for an automobile driven by a gas-engine having an intake manifold in which a partial vacuum is developed by the engine, the combination of a steering cylinder, a piston movable therein, a steering gear connecting the piston with the wheels to be steered, a steering shaft with a hand-wheel for rotating the same, a worm and a worm-shaft in alinement with the steering shaft, a valve actuated by the steering shaft, and connecting the steering shaft to the worm, a pipe connection corresponding to each end of the cylinder and connecting the same with the valve, a pipe connection connecting the intake manifold with the valve, said valve having means for connecting either end of the cylinder to the intake and the other end of the cylinder to the atmosphere when steering, a worm wheel meshing with the worm and connected with the steering gear, said worm being rotatable by a motion transmitted through the valve from the hand-wheel to permit the movement of the steering gear by the steering cylinder.

4. In a steering gear for an automobile driven by a gas-engine having an intake manifold in which a partial vacuum is developed by the engine, the combination of a steering cylinder, a piston movable therein, a steering gear connecting the piston with the wheels to be steered, a steering shaft with a hand-wheel for rotating the same, a valve mounted on the axis of the steering shaft, including a relatively fixed valve member, a valve member rigid with the steering shaft, and a coaxial valve member to connect with the wheels for steering the same, a worm rigid with the last-named valve member, said two last-named members having means for permitting a limited rotary movement of the hand-wheel with respect to the said coaxial member, and enabling the hand-wheel to impart movement through the valve to the worm, and thereby controlling the movement of the steering gear by the steering cylinder, a pipe connection corresponding to each end of the cylinder and connecting the same with the relatively fixed valve member, and a pipe connection connecting the intake manifold with the relatively fixed valve member, said valve members having ports operating when the hand-wheel is rotated, to connect either end of the cylinder to the intake and the other end of the cylinder to the atmosphere.

5. In a steering gear for an automobile driven by a gas-engine having an intake manifold in which a partial vacuum is developed by the engine, the combination of a steering cylinder, a piston movable therein, means connecting the piston with the wheels to be steered, a steering shaft with a hand-wheel for rotating the same, a valve mounted on the axis of the steering shaft, including a relatively fixed valve member, a valve member rigid with the steering shaft, and a coaxial valve member connected with the wheels for steering the same, said two last-named members having means for permitting a limited rotary movement of the hand-wheel with respect to the said coaxial member, a pipe connection corresponding to each end of the cylinder and connecting the same with the relatively fixed valve member, and a pipe connection connecting the intake manifold with the relatively fixed valve member, said valve members having ports operating when the hand-wheel is rotated, to connect either end of the cylinder to the intake and the other end of the cylinder to the atmosphere, the connection between the coaxial member and the wheels for steering the same including a worm-shaft and a worm rigid with the coaxial member, and a worm-wheel actuated by the worm and connected with the wheels.

6. In a steering gear for an automobile driven by a gas-engine having an intake manifold in which a partial vacuum is developed by the engine, the combination of a steering cylinder, a piston movable therein, means connecting the piston with the wheels to be steered, a steering shaft with a hand-wheel for rotating the same, a valve mounted on the axis of the steering shaft, including a valve member rigid with the steering shaft, and a coaxial member connected with the wheels for steering the same, said last-named members having a connection between the same permitting a limited rotary movement of the hand-wheel with respect to the coaxial member, said valve also including a relatively fixed valve member with three arcuate ports, a pipe connection corresponding to each end of the cylinder and connecting the same with two of said arcuate ports, and a pipe connection connecting the intake manifold with the other of said arcuate ports, said coaxial valve member and said first-named valve member having ports operating when the hand-wheel is rotated and producing a relative movement between the hand-wheel and the coaxial member, to connect either end of the cylinder to the intake and the other end of the cylinder to the atmosphere.

7. In a steering gear for an automobile driven by a gas-engine having an intake manifold in which a partial vacuum is developed by the engine, the combination of a steering cylinder, a piston movable therein, means connecting the piston with the wheels to be steered, a steering shaft with a hand-wheel for rotating the same, a valve mounted on the axis of the steering shaft, including a valve member rigid with the steering shaft, and a coaxial member connected with the wheels for steering the same, said last-named members having a connection between the same permitting a limited rotary movement of the hand-wheel with respect to the coaxial member, said valve also including a relatively fixed valve member with three arcuate ports, a pipe connection corresponding to each end of the cylinder and connecting the same with two of said arcuate ports, and a pipe connection connecting the intake manifold with the other of said arcuate ports, said coaxial valve member and said first-named valve member having ports operating when the hand-wheel is rotated and producing a relative movement between the hand-wheel and the coaxial member, to connect either end of the cylinder to the intake and the other end of the cylinder to the atmosphere, and resilient means associated with the said connection between the said coaxial valve member and the first-named valve member operating to move the first-named member into a neutral position after the steering wheel has been turned into a new steering position, and thereby maintain both ends of the cylinder closed off from the atmosphere in the new steering position, so that the steering cylinder operates as a dashpot to hold the wheels in the new steering position.

8. In a steering gear for an automobile driven by a gas-engine having an intake manifold in which a partial vacuum is developed by the engine, the combination of a steering cylinder, a piston movable therein, means connecting the piston with the wheels to be steered, a steering shaft with a hand-wheel for rotating the same, a valve actuated by the steering shaft, including a valve member mounted to rotate in unison with the steering shaft and a valve member coaxial with the last-named valve member and connected with the wheels for steering the same, said valve members having a connection between the same permitting a limited rotary movement of the first-named member with respect to the second-named member, a pipe connection corresponding to each end of the cylinder and connecting the same with the valve, a pipe connection connecting the intake manifold with the valve, said valve having ports operating when the hand-wheel is rotated and producing a relative movement between said two valve members, to connect either end of the cylinder to the intake and the other end of the cylinder to the atmosphere, and resilient means associated with the connection between the first-named valve member and the coaxial valve member to move the first-named member to neutral position after the hand-wheel has been rotated and stopped in a new steering position, whereby the communication with the atmosphere is cut off from both ends of the steering cylinder, thereby enabling the steering cylinder to operate as a dashpot for the wheels of the automobile in the new steering position.

9. In a steering gear for an automobile driven by a gas-engine having an intake manifold in which a partial vacuum is developed by the engine, the combination of a steering cylinder, a piston movable therein, means connecting the piston with the wheels to be steered, a steering shaft with a hand-wheel for rotating the same, a valve mounted on the axis of the steering shaft, including a valve member rigid with the steering shaft and having an atmospheric port therethrough corresponding to each end of the steering cylinder, and a coaxial valve member connected with the wheels for steering the same, said last-named members having means permitting a limited rotary movement of the first-named valve member with respect to the second-named valve member, a pipe connection corresponding to each end of the cylinder and connecting the same with the valve, and a pipe connection connecting the intake manifold with the valve, said valve including a relatively fixed valve member with arcuate ports corresponding to said pipe connections and connected therewith, said coaxial valve member having connection ports cut therein for opening communication between the said atmospheric ports and said arcuate ports, and between the arcuate ports and co-operating when the hand-wheel is rotated and producing a relative movement between the said two first-named valve members, to connect either end of the cylinder to the intake and the other end of the cylinder to the atmosphere.

10. In a steering gear for an automobile having a steering shaft and hand wheel for rotating the same, the combination of a steering cylinder, a piston movable therein, having a single piston head normally located in mid-position in the cylinder, means connecting the piston with the wheels to be steered, a rotary valve mounted in and actuated by the steering shaft, and including a lost motion connection for operating the valve, and enabling the automobile to be steered by hand with the hand-wheel, a source of pneumatic pressure, connections from the said valve to both ends of said steering cylinder, respectively, said valve having means for admitting atmospheric pressure to either end of said steering cylinder, and for simultaneously connecting the other end of the said steering cylinder to said source of pneumatic pressure.

11. In a steering gear for an automobile having a steering shaft and hand wheel for rotating the same, the combination of a steering cylinder, a piston movable therein, having a single piston head normally located in mid-position in the cylinder, means connecting the piston with the wheels to be steered, a rotary valve mounted in and actuated by the steering shaft, and including a lost motion connection for operating the valve, and enabling the automobile to be steered by hand with the hand-wheel, a source of pneumatic pressure, a pipe connection from the said valve to one end of said steering cylinder, a pipe connection from the said valve to the other end of said steering cylinder, said valve having means for admitting atmospheric pressure to either end of said steering cylinder and for simultaneously connecting the other end of said steering cylinder to said source of pressure.

12. In a steering gear for an automobile driven by a gas-engine having an intake manifold in which a partial vacuum is developed by the engine, the combination of a steering cylinder, a piston movable therein, a steering gear connecting the piston with the wheels to be steered, a steering shaft with a hand-wheel for rotating the same, a worm having a shaft alining with the steering shaft, a worm-wheel meshing with the worm and connected with the steering gear, a valve mounted on the axis of the steering shaft, a pipe connection corresponding to each end of the cylinder and connecting the same with the valve, a pipe connection connecting the intake manifold with the valve, said valve having means for connecting either end of the cylinder to the intake and the other end of the cylinder to the atmosphere when steering, and a connection through said valve for imparting movement between the hand-wheel and the worm, enabling the rotation of the worm by the hand-wheel to permit the steering cylinder to move the steering gear.

13. In a steering gear for an automobile driven by a gas-engine having an intake manifold in which a partial vacuum is developed by the engine, the combination of a steering cylinder, a piston movable therein, a steering gear connecting the piston with the wheels to be steered, a steering shaft with a hand-wheel for rotating the same, a worm having a shaft aligning with the steering shaft, a worm-wheel meshing with the worm and connected with the steering gear, a valve mounted on the axis of the steering shaft, a pipe connection corresponding to each end of the cylinder and connecting the same with the valve, a pipe connection connecting the intake manifold with the valve, said valve having means for connecting either end of the cylinder to the intake and the other end of the cylinder to the atmosphere when steering, said valve having means for maintaining both ends of the cylinder closed off from the atmosphere when the hand-wheel is in neutral position, whereby the cylinder operates as a dashpot to dampen the lateral movements of the wheels occasioned by the roadway, and a connection through said valve for imparting movement between the hand-wheel and the worm, enabling the rotation of the worm by the hand-wheel to permit the steering cylinder to move the steering gear.

14. In a steering gear for an automobile driven by a gas-engine having an intake manifold in which a partial vacuum is developed by the engine, the combination of a steering cylinder, a piston movable therein, a steering gear connecting the piston with the wheels to be steered, a steering shaft with a hand-wheel for rotating the same, a worm having a shaft alining with the steering shaft, a worm-wheel meshing with the worm and connected with the steering gear, a valve mounted on the axis of the steering shaft, including a valve member rigid with the steering shaft, and a coaxial valve member rigid on the worm shaft, said valve members having means for permitting a limited rotary movement of the first-named valve member with respect to the second-named valve member, and enabling manual force applied to the hand-wheel to rotate the worm-shaft, a pipe connection corresponding to each end of the cylinder and connecting the same with the valve, a pipe connection connecting the intake manifold with the valve, said valve having ports operating when the hand-wheel is rotated to produce a relative movement between said two valve members, to connect either end of the cylinder to the intake and the other end of the cylinder to the atmosphere, said worm operating when rotated, to permit the steering cylinder to move the steering gear.

Signed at Los Angeles, California, this 17th day of August, 1928.

JOHN D. MOFFET.